United States Patent
Lechner et al.

(10) Patent No.: US 12,388,248 B2
(45) Date of Patent: Aug. 12, 2025

(54) CABLE GLAND, USE OF A CABLE GLAND AND CONTACT ELEMENT

(71) Applicant: PFLITSCH GMBH & CO. KG, Hückeswagen (DE)

(72) Inventors: Martin Lechner, Lindlar (DE); Robert Von Otte, Schalksmühle (DE)

(73) Assignee: PFLITSCH GMBH & CO. KG, Hückeswagen (DE)

( * ) Notice: Subject to any disclaimer, the term of this patent is extended or adjusted under 35 U.S.C. 154(b) by 0 days.

(21) Appl. No.: 18/934,624

(22) Filed: Nov. 1, 2024

(65) Prior Publication Data

US 2025/0062604 A1   Feb. 20, 2025

Related U.S. Application Data

(63) Continuation of application No. PCT/EP2023/062002, filed on May 5, 2023.

(30) Foreign Application Priority Data

May 5, 2022 (DE) .......................... 102022111205.5

(51) Int. Cl.
*H02G 15/068* (2006.01)

(52) U.S. Cl.
CPC ................................ *H02G 15/068* (2013.01)

(58) Field of Classification Search
CPC .............. H02G 3/0625; H02G 15/068; H01R 13/2421; F16F 1/045
See application file for complete search history.

(56) References Cited

U.S. PATENT DOCUMENTS

| | | | |
|---|---|---|---|
| 9,312,630 B2 * | 4/2016 | Huang | H01R 13/62 |
| 10,714,922 B2 * | 7/2020 | Platt | H02G 3/22 |
| 2004/0070128 A1 * | 4/2004 | Balsells | F16F 1/045 |
| | | | 267/180 |
| 2016/0076568 A1 | 3/2016 | Dilmaghanian et al. | |
| 2022/0399709 A1 * | 12/2022 | Pawar | H02G 15/013 |
| 2023/0344153 A1 * | 10/2023 | Buchanan | H01R 13/17 |

FOREIGN PATENT DOCUMENTS

| | | |
|---|---|---|
| CN | 204651864 | 9/2015 |
| DE | 102008018205 A1 | 12/2009 |
| DE | 102008018205 B4 | 12/2015 |

OTHER PUBLICATIONS

International Search Report issued in corresponding International Application PCT/EP2023/062002, mailed Jul. 25, 2023.

\* cited by examiner

*Primary Examiner* — Hoa C Nguyen
*Assistant Examiner* — Amol H Patel
(74) *Attorney, Agent, or Firm* — Burris Law, PLLC

(57) ABSTRACT

A cable gland including a component and at least one contact element. The at least one contact element includes a plurality of substantially geometrically identically shaped windings. Each winding includes a retaining section for electrically contacting the component surrounding the contact element, at least one supporting section for electrically contacting a shield of a long-molded part, and a first and a second extending section. The retaining section, the first extending section and the at least one supporting section are arranged one after the other.

12 Claims, 11 Drawing Sheets

CABLE GLAND, USE OF A CABLE GLAND AND CONTACT ELEMENT

CROSS-REFERENCE TO RELATED APPLICATIONS

This application is a continuation of International Application No. PCT/EP2023/062002, filed on May 5, 2023, which claims priority to and the benefit of DE 10 2022 111 205.5 filed on May 5, 2022. The disclosures of the above applications are incorporated herein by reference.

FIELD

The present disclosure relates to a cable gland, a use of a cable gland and a contact element.

BACKGROUND

The statements in this section merely provide background information related to the present disclosure and may not constitute prior art.

Cable glands for providing electromagnetic compatibility are generally known from the prior art. For example, DE 10 2008 018 205 B4 discloses a device for the electromagnetically compatible arrangement of a cable with a contacting means comprising a coiled spring element, wherein windings of the spring element comprise a substantially straight retaining section which is aligned parallel to the sheath of the through opening in the intended assembly position, and wherein a support region is formed by substantially straight winding sections adjoining the straight retaining sections at an angle, wherein the windings of the spring element have a cross-sectional shape of an isosceles triangle.

Cable glands known from the prior art have the disadvantage that they easily tilt or jam when a long-molded part is mounted in a cable gland comprising a contact element. Particularly with small cable diameters relative to a chamber of the cable gland in which the contact element is arranged, the cable glands known from the prior art become twisted, which either makes assembly more difficult or does not provide desired electrical contact. Furthermore, the installation of flexible cables in the cable gland is not convenient for the above reasons.

SUMMARY

This section provides a general summary of the disclosure and is not a comprehensive disclosure of its full scope or all of its features.

The present disclosure provides a cable gland and a contact element. In particular, the present disclosure provides a cable gland and a contact element that is convenient to assemble. In particular, the present disclosure provides a contact element and a cable gland which enable safe electrical contacting. In particular, the present disclosure provides a cable gland and a contact element that makes it easy to assemble a flexible long-molded part.

The present disclosure provides a cable gland comprising a component and at least one contact element, wherein the at least one contact element comprises a plurality of windings which are substantially geometrically shaped in the same way, wherein each winding comprises a retaining section for electrically contacting the component surrounding the contact element, at least one supporting section for electrically contacting with a shield of a long-molded part and a first and a second extending section, wherein the retaining section, the first extending section and the at least one supporting section are arranged one after the other.

Furthermore, the present disclosure provides a cable gland described above for the electrical contacting of at least one shield of at least one long-molded part.

Furthermore, the present disclosure provides a contact element for a cable gland described above, comprising a plurality of windings which are substantially geometrically identical in shape, each winding comprising a retaining section for electrically contacting a component surrounding the contact element, at least one supporting section for electrically contacting a shield of a long-molded part and a first and a second extending section each extending in a straight line, the first and the second extending section connecting the retaining section to the at least one supporting section.

A contact element for a cable gland is proposed. The contact element comprises a plurality of windings which are substantially geometrically shaped in the same way. Each winding comprises a retaining section for electrically contacting a component surrounding the contact element, at least one supporting section for electrically contacting a shield of a long-molded part and a first and a second extending section. The retaining section, the first extending section and the at least one supporting section are arranged next to each other. In one example, the second extending section is arranged one after the other of the at least one supporting section.

In the sense of the present disclosure, "geometrically identical" is to be understood as meaning that the shaping of the windings, in particular in a view in each case onto a winding in the circumferential direction of the contact element, are substantially congruent. In particular, the projections of the windings are each substantially congruent to a plane on which a radius is arranged starting from a central longitudinal axis of the contact element and which at least intersects the respective winding, in one example at least intersects a retaining section of the winding.

The term "substantially" indicates a tolerance range that is justifiable for the person skilled in the art from an economic and technical point of view, so that the corresponding feature can still be recognized or realized as such.

The windings within the sense of the present application are defined by a starting point and an end point. In one example, the through opening is defined by the windings, for example by the supporting sections of the windings, and in one example by radial sections which connect the first and second supporting sections of a winding in each case. In one example, the starting point and the end point comprise the same distance from the central longitudinal axis of the contact element. As an alternative, the starting point and end point may comprise a different distance from the central longitudinal axis of the contact element. The individual windings extend helically between the starting point and the end point. In one example, the starting point and/or the end point is arranged in a transition, for example before or after a radial section, from the second extending section of a winding to a retaining section of the next winding. In the sense of the present disclosure, the retaining section, extending section and/or supporting section are not considered to be subdivided by the starting point and/or end point. For example, if the contact element is cut open in the plane of the starting point and the end point at a transition between the second extending sections and the retaining sections along a circumference of the contact element, the latter breaks up into the individual windings.

In one example, it is provided that the first and/or the second extending section extend in a straight line. In a further example, it is provided that the first and/or the second extending section extend in an arc. In one example, the first and/or the second extending section curves in the direction of the central longitudinal axis. Furthermore, in one example, the first and/or the second extending sections curve in such a way that an envelope end of the contact element comprises a concave surface in the region of the first and/or second extending sections. Furthermore, in one example, the first and/or the second extending sections curve in such a way that an envelope end of the contact element comprises a convex surface in the region of the first and/or second extending sections. In a further example, it is provided that the first and/or the second extending section extends straight or curved in a plane whose normal is the central longitudinal axis.

In the sense of the present disclosure, an envelope of the contact element is an imaginary surface that, in one example, touches the outside of each winding of the contact element.

In one example, it is provided that in the inserted state the diameter of the through-opening is the same as in the non-inserted state, in particular if the outer diameter of the non-inserted contact element is smaller than or equal to the inner diameter of the component. In one example, at least in the installed state, at least the outer diameter of the contact element is widened by inserting the long-molded part in such a way that the retaining sections make electrical contact with the inner wall of the component. Furthermore, the diameter of the through-opening is in one example smaller in the inserted state than in the non-inserted state. Furthermore, in one example the diameter of the through-opening is the same in the inserted state as in the non-inserted state.

In one example, it is provided that the minimum diameter of the through-opening is a fraction of an installation diameter of the contact spring. In one example, the minimum diameter of the through-opening is a diameter of the through-opening in the inserted state of the contact element.

In one example, the installation diameter is the outer diameter of the contact element in the installed state. In one example, the installation diameter is an inner diameter of the component into which the contact element can be inserted and for which the contact element is provided.

In one example, the ratio of through opening to installation diameter is about 0.1 to about 0.7, more for example about 0.15 to about 0.5, and in one example about 0.2 to about 0.3.

In one example, it is provided that the through-opening comprises a maximum diameter. The maximum diameter is the diameter of the through-opening in the installed state, i.e. with the long-molded part inserted. In one example, the windings are deflected substantially to the maximum by the long-molded part. In one example, the maximum diameter is about 1.5 times as large to about 1.8 times as large, for example about 2 times as large to about 5 times as large, and in one example about 2.5 times as large to about 3 times as large, as the minimum diameter of the through-opening.

In an example in which the windings in the non-inserted state comprise an orientation in a top view of the contact element in the direction of the central longitudinal axis which is angular to the radius on the central longitudinal axis, an orientation of the windings can be changed when the contact element is mounted in the component. In one example, the angle of the orientation, which deviates from the radius on the central longitudinal axis, increases when the contact element is mounted in the component and/or when a long-molded part is inserted, in particular when the contact element is inserted in the component.

In one example, it is provided that the basic shape of the windings, as seen in a view of the respective winding in the circumferential direction, is configured in the shape of a house, wherein in one example the at least one supporting section forms a roof, wherein the first and second extending sections form walls and wherein the retaining section forms a foundation or floor.

In one example, the contact element is configured for contacting at least one shield of a long-molded part.

The long-molded part within the present disclosure comprises at least one elongate, in particular flexible, for example flexible, body selected from a group comprising cables, hoses and/or tubes. In one example, at least one long-molded part can be passed through the contact element. Furthermore, in one example, the at least one long-molded part can be passed through the contact element mounted in the component. In one example, the long-molded part comprises an electromagnetic shield, which is further at least partially stripped in the area in which the contact element abuts or in the area of a cable gland.

The contact element in one example comprises a wire that shapes the windings. The wire comprises a wire diameter. In the sense of the present disclosure, the wire diameter is to be understood as a diameter of the wire transverse to the longitudinal extension of the wire that shapes the individual windings. In one example, the wire is metallic, electrically conductive and resilient. In one example, it is provided that the wire that shapes the individual windings comprises a substantially circular cross-section. In one example, the wire that shapes the individual windings comprises a cross-section that deviates from a circular shape. In a further example, the wire comprises a quadrangular, for example a rectangular, and in one example a square cross-section.

In the sense of the present disclosure, a cross-section is a section transverse to a longitudinal extension.

In the present disclosure, the contact element is described in an uninstalled state, unless otherwise stated. If the contact element is inserted in a chamber of a component, for example a cable gland, the contact element is in an inserted state. If a long-molded part is arranged in the chamber of a component with the contact element, the contact element is in an installed state.

The contact element in one example comprises a through opening, which is further surrounded by the windings or defined by them. If at least one long-molded part is inserted into the contact element, in particular guided through the through opening, it is advantageously contacted by the windings, depending on the diameter of the at least one long-molded part or an envelope formed by a plurality of long-molded parts. In particular, if the long-molded part or parts comprise an exposed electromagnetic shield in a contact area, an electric current can flow between the shield and the contact element, voltage equalization can take place and/or, in particular, the long-molded part or parts can be grounded. In one example, an electric current can flow between the shield and the contact element, voltage equalization can take place and/or, in particular, the long-molded part(s) can be grounded if the contact element is electrically connected to the component, which is in one example electrically grounded. The secure electrical connection between the long-molded part and the component, which is made possible by the contact element, advantageously provides electromagnetic compatibility.

An advantage of the proposed contact element is that it is more torsion-resistant than contact elements known from the prior art. Advantageously, the contact element is not tilted and/or twisted in the chamber during assembly or insertion of the long-molded part, which is particularly flexible, through the opening of the contact element, which is inserted into a chamber of a component. This provides safe and simple assembly. The proposed contact element is particularly advantageous for the convenient assembly of flexible long-molded parts, such as cables. Furthermore, the extending sections of the individual windings advantageously rest on an end wall and/or on at least one circumferential shoulder of the component, for example on the inside. This stabilizes the contact element in the chamber and also provides a larger electrical contact surface via which an electrical current and/or a heat flow can be dissipated. In particular, a radial extension of the at least partially radially circumferential shoulder, which secures the spring in the chamber, can in one example be used substantially completely as an electrical contact surface. In the case of springs with a triangular cross-section, on the other hand, only punctual electrical contact between the spring and the shoulder and/or end wall is possible.

Each winding of the contact element comprises a retaining section. This is configured in a straight line. In one example, the retaining section is configured for electrical contact with a component in whose chamber the contact element can be inserted or is arranged. Furthermore, it is possible for the retaining section to make contact with an inner wall of the component, for example the cable gland. In one example, the inner wall is to be understood as the, for example, cylindrically circumferential wall of the component, which in one example is bounded on the end wall by at least one radially circumferential shoulder.

In one example, the retaining section or a projection of the retaining section is arranged at an angle or parallel to the central longitudinal axis in a view plane on which the central longitudinal axis is arranged. In a further example, it is provided that the at least one retaining section is configured in a straight line, and further to a central longitudinal axis of the contact element passing centrally through the through opening at an angle in a range of about −50° to about +50°, for example about −45° to about +45°, and in one example about −30° to about +30°—in a radial view of the central longitudinal axis, in which the central longitudinal axis and the retaining section are arranged on the viewing plane or the retaining section intersects the viewing plane or is also arranged on it. In a further example, it is provided that, in a view radially onto the central longitudinal axis, a retaining section which, in a projection onto the viewing plane, is intersected approximately centrally by the central longitudinal axis or coincides substantially with the latter, the angle between the retaining section and the central longitudinal axis is about-10° to about +10°.

In particular, an envelope can be placed around the contact element. The envelope is an imaginary surface that touches each winding, in one example each section of each winding of the contact element. The envelope configures a sheath surface in the area of the retaining sections. In one example, the sheath surface of the envelope of the contact element is shaped substantially conically or cylindrically. The conical shape of the contact element, which is derived from the outer surface, has the advantage that the contact element can be easily inserted into a component or a chamber of the component that is configured cylindrically on the inside in particular. In particular, the angled retaining sections or those forming a sheath surface of the conical enveloping ends can be placed against the inner wall of the component or the chamber, with the windings in one example aligned at an angle to the radius on the central longitudinal axis in a view of the contact element in the direction of the central longitudinal axis. For example, the retaining sections abut the inner wall of the chamber in an inserted state and/or an installed state and are deformed according to the shape of the inner wall. For example, a cylindrical inner wall of the chamber can deform the contact element in such a way that the sheath surface of the envelope ends of the inserted or installed contact element is configured cylindrically.

If the term "about" is used in the context of the present disclosure in connection with values or value ranges, this is to be understood as a tolerance range which the person skilled in the art considers to be customary in this field, in particular a tolerance range of ±20%, for example ±10%, and in one example ±5%, is provided. Insofar as different value ranges, for example value ranges and further example value ranges, are indicated in the present disclosure, the lower limits and the upper limits of the different value ranges can be combined with one another. In the context of the present disclosure, the term "substantially" indicates a tolerance range which is justifiable for the person skilled in the art from an economic and technical point of view, so that the corresponding feature can still be recognized or realized as such.

Exemplary enumerations are not to be regarded as exhaustive in the sense of the present disclosure but can be supplemented within the framework of general technical knowledge.

The contact element comprises at least one supporting section for electrically contacting a shield of a long-molded part. In one example, it is provided that the at least one supporting section is arranged in an arcuate or circular segment shape between the first extending section and the second extending section. In a one example, it is provided that a first supporting section and a second supporting section are provided. In one example, the first and second supporting sections are configured to be substantially rectilinear. In one example, it is provided that the windings comprise a first supporting section and a second supporting section which are adjacent to one another. In a further example, it is provided that the supporting sections comprise an angle of about 30° to about 130°, for example about 60° to 110°, and in one example about 45° to about 90°, relative to each other.

In one example, it is provided that the first supporting section and the second sup-porting section are approximately the same length.

In one example, it is provided that the at least one supporting section, for example the first and second supporting sections, each adjoin an extending section.

The contact element comprises a first extending section and a second extending section, each of which extends in a straight line. In one example, the first extending section and the second extending section are arranged on parallel planes. In one example, the first extending section and the second extending section are arranged on parallel planes in the inserted state. In one example, the first extending section and the second extending section are arranged on parallel planes in the installed state. Further, an envelope end of the contact element configures a conical surface in the region of the first extending section and/or in the region of the second extending section, in the non-inserted, inserted and/or installed state.

In one example, it is provided that the first extending section and the second extending section are configured to be substantially the same length. In one example, the distance between the retaining section and the supporting section of a winding is the length of the extending section.

Further, a maximum distance between the retaining section and the supporting section, a distance between a radially outermost point of the retaining section and a radially innermost point of the supporting section, defines a radial extension of the contact element.

In one example, the ratio of the length of the extending section and the radial extension of the contact element is about 0.1 to about 0.45, for example about 0.2 to about 0.4, and in one example about 0.3 to about 0.35.

In a further example, it is provided that the ratio of the length of the extending section to the installation diameter of the contact element is about 0.5 to about 1, for example about 0.25 to about 0.46, and in one example about 0.3 to about 0.44.

In a further example, it is provided that the extending section comprises an angle of about 80° to about 100°, for example about 80° to about 90°, about 80° to about 89°, and in one example about 85°, to the retaining section, in particular in the inserted state. Surprisingly, it has been shown that the fit of the contact element, in particular in a cable gland, is also more secure when inserting or removing a long-molded part, in particular a cable, if the angle between the extending section and the retaining section is less than about 90°. In particular, the angle between the retaining section and the extending section can be selected in such a way that it does not exceed about 90° even in the event of production-related tolerance deviations.

In one example, it is provided that the retaining section, the first extending section, the second extending section and/or the at least one supporting section are configured in a substantially straight line.

In one example, it is provided that the retaining section is adjacent to the first extending section, wherein the first extending section is adjacent to at least one supporting section, and wherein the at least one supporting section is adjacent to the second extending section. In one example, the second supporting section is adjacent to the first supporting section. Further in one example, the second extending section adjoins the retaining section of the next winding.

In one example, it is provided that a radial section is configured between the retaining section and the first and second extending sections and/or between the at least one supporting section and the first and second extending sections. In one example, the radial section is configured to be as small as possible. Further, the radial section represents the desired bending radius, which is arranged between the individual sections. In one example, it is provided that the radial section is larger than desired. In the sense of the present disclosure, the retaining section, the first extending section, the at least one supporting section and the second extending section are each adjacent to one another, even if a radial section is arranged between them.

The individual windings of the contact element can be described as house-shaped in a top view of the windings, in one example in a longitudinal section of the contact element. In the house shape of the windings, the retaining section in one example represents a floor, the extending sections represent the walls and the at least one supporting section represents the roof, with a first and a second supporting section shaping or indicating a gable roof. In one example, the winding can be described in a circumferential view with the Unicode character ⌂(U+2302).

In one example, it is provided that the contact element is configured in the shape of a ring or torus. In one example, the ring-shaped or toroidally configured spring is closed in itself, and further shaped into a ring or torus by connecting or joining the ends. Furthermore, the contact element in one example comprises a coiled, ring-shaped closed spring, made of a wire-shaped material. In one example, the contact element comprises at least one electrically conductive material. In one example, the contact element comprises at least one material selected from a group comprising steel, spring steel, copper, gold, brass and/or carbon and modifications thereof. Furthermore, one envelope end of the contact element is configured substantially like a torus.

In one example, the contact element is configured in such a way that it can adapt to a chamber comprising a cylindrical or non-cylindrical inner wall.

In one example, it is provided that the windings of the contact element comprise a radial alignment at least in the inserted state and/or in a non-inserted state. In an example of the contact element in which the retaining section is arranged substantially parallel to the central longitudinal axis, the individual windings project two legs onto a viewing plane in a top view of the contact element in the direction of the central longitudinal axis. This is particularly the case if the contact element has a cylindrical shape, for example in the inserted state. In this case, the viewing plane is a plane whose normal is the central longitudinal axis of the contact element. In one example, the two legs projected onto the plane of view, of the extending section, further of at least the at least one supporting section and the extending section, are connected to each other at an apex. In one example, the apex is the connection between the first supporting section and the second supporting section. The bisector of the two legs is the alignment of the windings. If the alignment of the windings coincides with a radius of the contact element on the central longitudinal axis or is angled by about ±5° from the radius on the central longitudinal axis, the windings are substantially radially aligned in the sense of the present application. In this example, the windings comprise a substantially radial orientation in a non-inserted or inserted state of the contact element. If the bisecting line or the orientation of the windings deviates from the radius of the contact element on the central longitudinal axis by more than about ±5°, for example by about ±6° to about ±80°, the winding comprises an orientation deviating from the radius on the central longitudinal axis, for example in the installed state.

In a further example, it is provided that the windings in a non-inserted state and/or inserted state comprise an orientation which deviates about ±6° to about ±30°, for example about ±6° to about ±15°, and in one example about ±6° to ±10°, from the radius on the central longitudinal axis. Furthermore, in one example all windings deviate by approximately the same angle, in the same direction, counterclockwise or clockwise, from the radius on the central longitudinal axis.

In one example, it is provided that the contact element comprises a plurality of windings. In one example, it is provided that a nominal number of windings $W_n$ of the contact element depends on the radial extension of the contact element $E_r$, on the installation diameter $D_E$ and on the wire diameter $D_D$. In one example, the nominal number of windings of the contact element can be described by the formula $W_n = (D_E - 2 \cdot E_r)\pi/D_D$. The nominal number of windings reflects the theoretical, maximum, number of windings for the minimum diameter of the through-hole. In one example, the contact element is provided with a number of windings that is in a ratio of about 0.33 to about 3, for example about 0.4 to about 2.5, and in one example about 0.5 to about 2, to the nominal number of windings. In an additional example, the contact element is provided with a number of windings that is in a ratio of about 1 to about 3, for example about 1 to about 2.5, and in one example about 1 to about 2, to the nominal number of windings. Advantageously, by providing the extending sections, the windings of the contact element can twist or deflect in such a way in the uninstalled and inserted state that more windings can be made than the nominal number of windings specifies. Advantageously, by providing the extending sections, the deflection of the windings is furthermore defined in such a way in the inserted state that a provided minimum diameter of the through-opening can be formed.

In an example, it is provided that the contact element comprises a plurality of windings configured in a substantially identical manner. The individual windings comprise, for example, a retaining section, a first extending section, a first supporting section, a second supporting section and a second extending section. A first radial section is arranged between the retaining section and the first extending section. A second radial section is arranged between the first extending section and the first supporting section. A third radial section is arranged between the first supporting section and the second supporting section. A fourth radial section is arranged between the second supporting section and the second extending section. By way of example, the radial sections each form the transition between the adjacent linear sections, which adjoin one another and are at an angle to one another.

In an exemplary view plane in the direction of the circumference of the contact element, a winding can be described as house-shaped, wherein the first and second supporting sections can be described as a roof, on which the house walls from the first and second extending sections border and wherein the retaining section forms the floor.

In a non-inserted state, the windings are radially aligned, for example, whereby a through opening is formed by the supporting sections, through which a long-molded part not shown can be guided.

When the contact element is inserted into a chamber of the cable gland, for example, it is radially compressed. A distance between the supporting sections or the radial sections between the first and second supporting sections of adjacent windings is smaller than the distance between the windings in the non-inserted state due to the radial compression in the chamber. In one example, the supporting sections of the windings touch each other or a gap between them is completely closed. The diameter of the through opening is minimally reduced by the compression, for example. Despite the radial compression, the windings are aligned in a substantially radial direction. The radial alignment is determined by the bisector of an angle that is enclosed by the winding or the first and second extending sections. In the example, in which the windings comprise a radial orientation, the bisector of the angle between the extending sections and the radius of the contact element coincide substantially. As an example, the contact element comprises twelve windings with an installation diameter DE of about 13 mm, a radial extension Er of about 4.5 mm and a wire diameter DD of about 1 mm. This corresponds approximately to the nominal number of windings.

If, for example, a long-molded part is arranged in the through opening of the contact element inserted in the cable gland, the contact element is in the installed state. The windings are deformed by the long-molded part in such a way that the orientation or the bisector of the angle formed by the extending sections is aligned at an angle to the radius of the contact element. The long-molded part expands the diameter of the through opening to the outer diameter of the long-molded part, which is not specified here. Furthermore, by way of example, the long-molded part, which is arranged in the through opening, deforms the windings in such a way that they contact each other at least in the area of the supporting sections.

In one example, a contact element as described above is used for the electrical contacting of components with a shielding function and/or current-carrying function.

In one example, it is provided that the contact element is used for installation in a component with a rotationally symmetrical, for example cylindrical or conical, inner wall. As an alternative, the inner wall can also be configured in a toroidal or double-conical shape or comprise another rotationally symmetrical example. It is in one example provided that the contact element is used for insertion into the component with a chamber, for example a cable gland, as described below.

In an example, it is provided that the contact element is used for insertion into a chamber of a component of a cable gland. For example, it is provided that a cable is passed through the chamber, the exposed shield of which is contacted by means of the contact element and electrically connects the shield to the component. Furthermore, the use of a contact element for contacting components with a shielding function and/or current-carrying function is proposed.

Furthermore, a cable gland comprising a component and at least one contact element is proposed. The contact element comprises a plurality of substantially geometrically identically shaped windings, each winding comprising a retaining section for electrically contacting the component surrounding the contact element, at least one supporting section for electrically contacting a shield of a long-molded part and a first and a second extending section each extending in a straight line. The first and second extending sections connect the retaining section to the at least one supporting section. In one example, the contact element is configured as described above.

In one example, the cable gland comprises a nipple, for example a double nipple. Furthermore, the nipple is advantageously the component that accommodates the contact element. The component in one example comprises a chamber with an inner wall on which the contact element is supported. Furthermore, the retaining section is in one example supported against the inner wall of the component. The inner wall of the component is configured cylindrically. Furthermore, a vertical axis of the component, in particular of the cylindrical inner wall, extends parallel, in one example congruently, to the central longitudinal axis of the installed contact element.

When the contact element is inserted into the component, the contact element is deformed. The contact element in the assembled state is inserted into the component in such a way that the retaining sections are at least partially, in one example completely, in contact with the inner wall of the component. In particular, an inner diameter of the component is smaller than a maximum outer diameter of the uninserted contact element. In one example, the contact element is at least partially compressed in the radial direction when it is mounted in the component. Furthermore, a retaining section which, in the non-inserted state, is arranged on a plane in which the central longitudinal axis lies at an angle of about −50° to about +50° to the central longitudinal axis of the through opening of the contact element, is aligned substantially parallel to the central longitudinal axis in the assembled state.

In one example, it is provided that the cable gland comprises a component with a chamber which is bounded radially to the central longitudinal axis by an inner wall and along the central longitudinal axis by at least one radially at least partially circumferential shoulder. The at least one shoulder can be configured as a discrete reduction of an inner diameter of the component. Furthermore, the at least one shoulder can be configured as a wall. In one example, the at least one shoulder configured as a wall can either be flush with the component on the outside, on one side or form a boundary within the component. The at least one at least partially radially circumferential shoulder shapes an insertion opening through which the contact element can be inserted into the chamber. In one example, the contact element is compressed radially in order to insert it into the chamber through the insertion opening. Furthermore, the contact element relaxes in the chamber in such a way that the contact element is inhibited from slipping out of the chamber by the at least one shoulder.

In one example, it is provided that the first and/or the second extending section is at least partially in contact with the at least one circumferential shoulder. In one example, electrical contact is provided between the first and/or second extending section and the at least one circumferential shoulder.

In one example, it is provided that the shoulder of the component axially limits or supports the contact element in its movement. In one example, it is provided that the shoulder comprises a radial extension. In one example, the radial extension is an extension from an inner wall of the component to a radially inner edge of the shoulder. The radial extension in one example comprises a ratio of about 2.5 to about 7 to the wire diameter of the contact element, for example about 3 to about 5, and in one example about 3.5 to about 4.5. In one example, the wire diameter is about 0.5 mm to about 5 mm, and is for example about 1 mm to about 2 mm.

In one example, it is provided that at least one retaining section, for example a plurality of retaining sections, and in one example all retaining sections, of the at least one contact element abut or lie against an inner wall of a component of the cable gland. In one example, the contact element is deformed by the chamber, by the inner wall of the chamber, in such a way that a lateral surface of the envelope ends of the contact element is adapted to the shape of the inner wall. In one example, the retaining sections lie against the inner wall in such a way that the envelope end in the area of the retaining sections takes on the shape of the inner wall. For example, the inner wall can be shaped cylindrically or conically. In one example, the inner diameter of the chamber is smaller than the outer diameter of the contact element in the non-inserted state.

In one example, it is provided that the windings comprise a radial alignment in the inserted state. In a further example, it is provided that the windings in an inserted state in a component, in particular with a cylindrical inner wall, are aligned with the central longitudinal axis at an angle to the radius.

In one example, it is provided that the orientation of the windings in an installed state deviates from the radius on the central longitudinal axis by about ±6° to about ±50°, for example about ±6° to about ±30°, and in one example about ±8° to ±25°. In a further example, it is provided that the alignment of the windings in an installed state with the long-molded part passed through deviates about ±10° to about ±80°, for example about ±10° to about ±75°, and in one example about ±20° to ±70°, from the radius on the central longitudinal axis.

By passing the long-molded part through the chamber with the inserted contact element, the bending of the windings, for example all windings, to the radius is increased compared to the inserted state in such a component.

In one example, it is provided that the at least one contact element is accommodated in a chamber of a component comprising at least one external thread, wherein at least one long-molded part can be guided through the component. In one example, it is provided that the chamber of the component accommodates two or a plurality of contact elements. In a further example, it is provided that the component comprises a plurality of chambers, in each of which at least one contact element can be inserted. In a further example, it is provided that the cable gland comprises a plurality of components for the receptacle of at least one contact element in each case.

In one example of the cable gland with at least one long-molded part, it is provided that the at least one long-molded part is arranged at least partially in a chamber with the at least one contact element, wherein the cable gland and the at least one long-molded part configure an installed state, wherein in the installed state the at least one supporting section of each winding of the at least one contact element abuts at least partially against a shield of the long-molded part and the windings deviate from a radial alignment. The at least one long-molded part is guided through the through opening of the at least one contact element. The windings in one example contact the long-molded part electrically, in particular a stripped section of the long-molded part.

In one example, the windings are aligned with the central longitudinal axis at an angle to the radius by mounting the long-molded part in the contact element. In one example, the long-molded part contacts and presses the windings in such a way that they move in radial alignment with the longitudinal center axis. In one example, the long-molded part contacts and presses the windings in such a way that they are displaced in a radial direction, relative to the central longitudinal axis, away from the central longitudinal axis if the outer diameter of the contact element in the inserted state without the long-molded part is smaller than the inner diameter of the component. In one example, the orientation of the windings is changed when the long-molded part is passed through the through opening of the contact element inserted in the component. If, for example, the windings are radially aligned before the long-molded part is passed through, they are displaced or deformed in such a way that they are aligned with the central longitudinal axis at an angle to the radius when the long-molded part is passed through. If, for example, the windings are aligned at an angle from the radius to the central longitudinal axis before the long-molded part is inserted, they are changed by inserting the long-molded part in such a way by shifting or deforming the windings that the angle to the radius increases to the central longitudinal axis.

In one example, the long-molded part comprises a long-molded part diameter that is greater than or equal to a diameter of the through opening of the contact element inserted in the component without the long-molded part. In one example, the long-molded part contacts the supporting section of the windings and/or the radial sections between the first and second supporting sections.

An exemplary cable gland comprises a pressure nut, a sealing element, a component and an O-ring. A contact element is arranged in the component as an example. The pressure nut can be screwed onto the component, whereby the sealing element is compressed and can fit tightly around a long-molded part. The O-ring can seal the cable gland against a connection geometry in which the cable gland is inserted.

As an example, the contact element is held in a chamber of the component by a radially circumferential shoulder. The chamber is bounded radially to the central longitudinal axis by an inner wall and along the central longitudinal axis by a radially circumferential shoulder. For example, the second extending section makes contact with the shoulder. By electrically contacting the shoulder with the second extending section of a contact element, an advantageous conduction of currents can be achieved. The retaining section makes contact with the inner wall of the chamber, for example. By electrically contacting the retaining section with the inner wall of the chamber, an advantageous dissipation of currents can also be achieved. Due to the example of the contact element, the inner surface of the chamber is utilized for current dissipation.

In a further example, a long-molded part, for example a cable, is inserted into the cable gland. The exemplary long-molded part comprises a stripped part with an exposed shield. The shield is electrically contacted in the chamber by the contact element. Due to the shape of the spring-like contact element, in particular due to the provision of first and second extending sections, the contact element is configured to be torsionally rigid during assembly of the long-molded part in such a way that tilting of the contact element in the chamber is inhibited, in particular when the flexible long-molded part is inserted.

Furthermore, a use of a cable gland described above for an electrical contacting of at least one shield of at least one long-molded part is proposed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
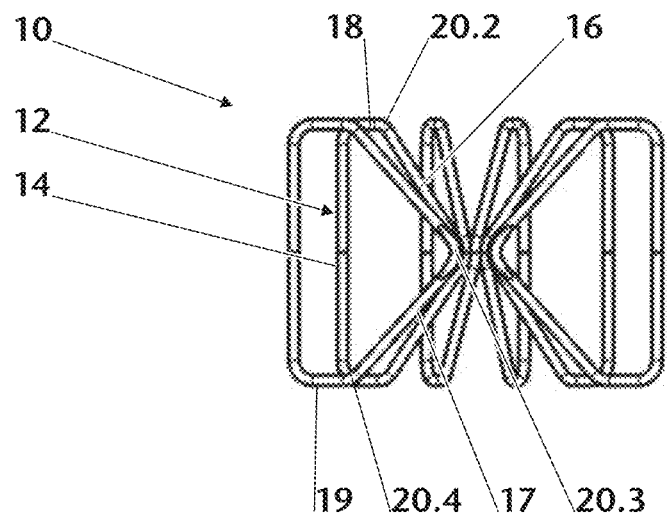
FIG. 1 is a sectional view I-I according to FIG. 2 through a contact element according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
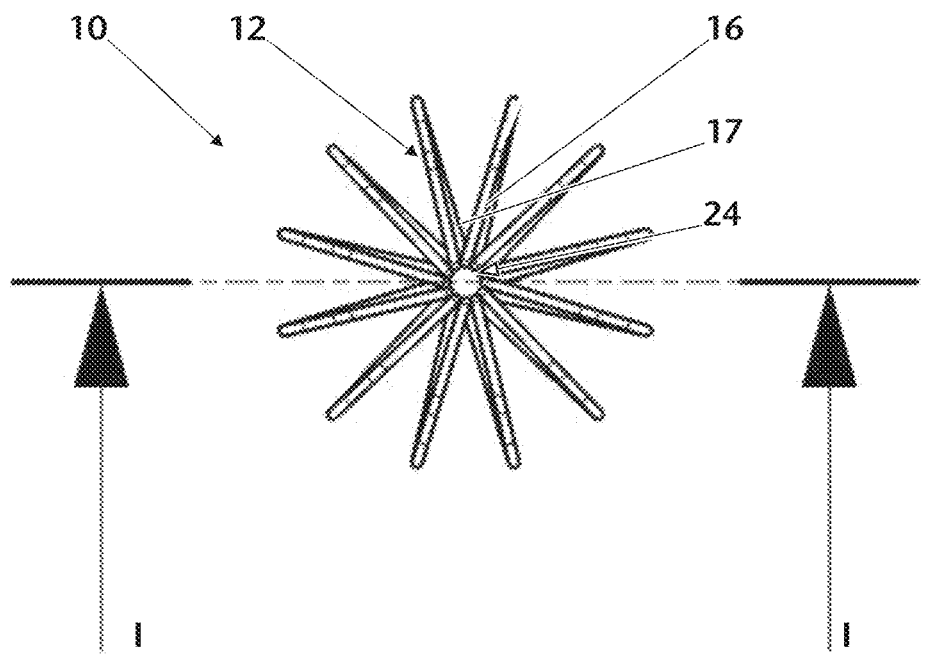
FIG. 2 is a top view of the contact element from FIG. 1 in the non-inserted state according to the present disclosure.

FIG. 1 shows a sectional view I-I according to FIG. 2 through a contact element 10. The contact element 10 comprises twelve windings 12 configured in a substantially identical manner, of which only one winding 12 is designated for the sake of clarity. The individual windings 12 comprise a retaining section 14, a first extending section 18, a first supporting section 16, a second supporting section 17 and a second extending section 19. A first radial section is arranged between the retaining section 14 and the first extending section 18, which cannot be seen behind a winding. A second radial section 20.2 is arranged between the first extending section 18 and the first supporting section 16. A third radial section 20.3 is arranged between the first supporting section 16 and the second supporting section 17. A fourth radial section 20.4 is arranged between the second supporting section 17 and the second extending section 19. The radial sections 20.1 to 20.4 each form the transition between the adjacent linear sections 14, 18, 16, 17, 19, which adjoin one another and are at an angle to one another.

In the plane of view, it can be seen that a winding 12 can be described as house-shaped, wherein the first and second supporting sections 16, 17 can be described as a roof with house walls from the first and second extending sections 18, 19 adjoining them, and wherein the retaining section 14 forms a floor.

FIG. 2 shows a top view of the contact element 10 from FIG. 1 in a non-inserted state. The windings 12 are radially aligned, whereby a through opening 24 is formed by the supporting sections 16 and 17, through which a long-molded part not shown can be guided.

Figure 3:
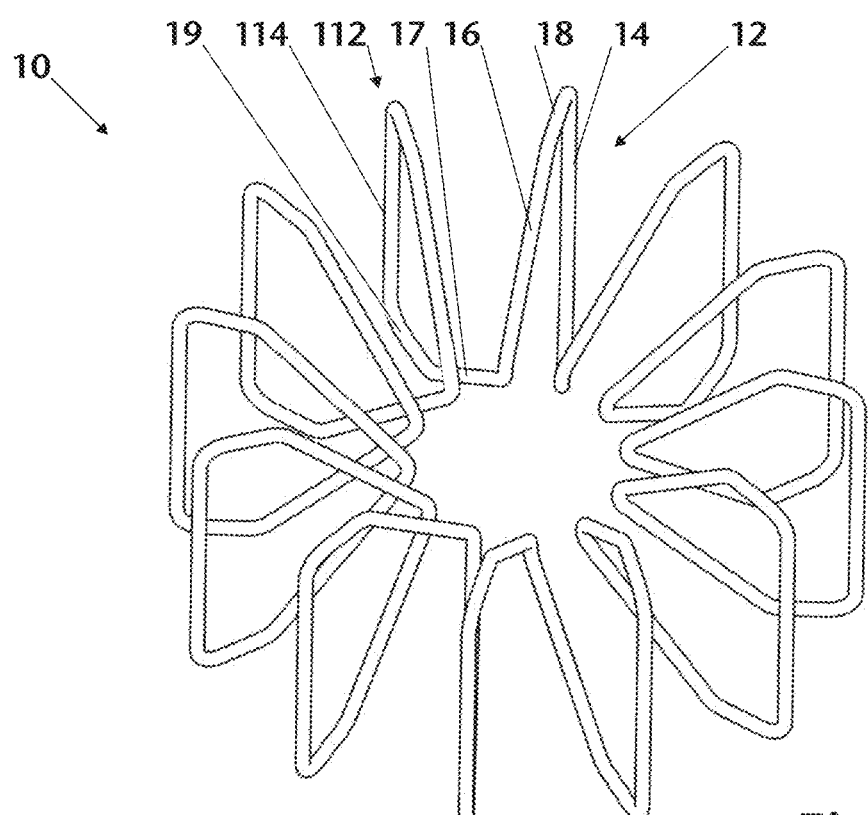
FIG. 3 is an isometric view of the contact element from FIG. 1.

FIG. 3 shows an isometric view of the contact element 10 of FIG. 1. It comprises twelve identically configured windings 12, 112, which are not all labeled for the sake of clarity. It can be seen from the isometric view that the first extending section 18 adjoins the retaining section 14. The first supporting section 16 adjoins the first extending section 18, which in turn adjoins the second supporting section 17. The second supporting section 17 adjoins the second extending section 19, which in turn adjoins the retaining section 114 of the next winding 112. Retaining section 14, first extending section 18, first supporting section 16, second supporting section 17 and second extending section 19 are thus arranged next to each other.

Figure 4:
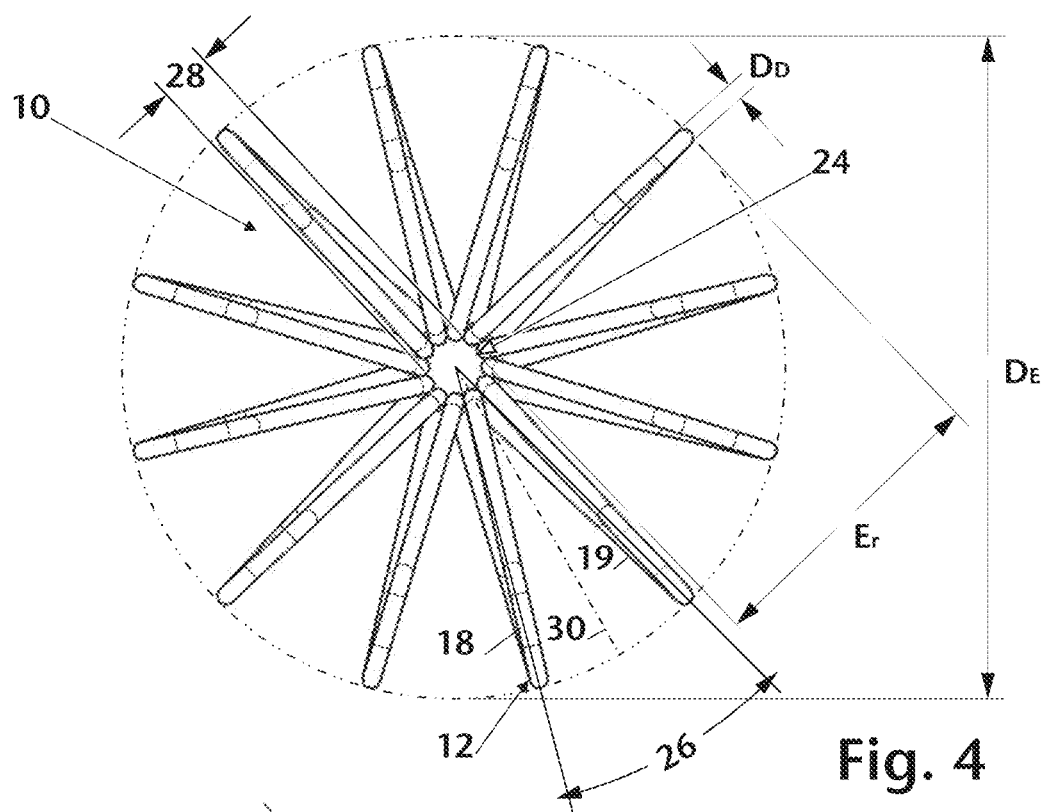
FIG. 4 is a top view of the contact element from FIG. 2 in the inserted state.

FIG. 4 shows a top view of the contact element 10 from FIG. 2 in the inserted state. The chamber into which the contact element 10 is inserted is not shown in this view for the sake of clarity. By inserting it into the chamber, the contact element 10 is radially compressed. The diameter 28 of the through opening 24 is reduced by the compression. Despite the radial compression, the windings 12 are in a substantially radial orientation. The radial alignment is determined by a bisector of an angle 26, which is spanned by the winding 12 or the first and second extending sections 18 and 19. In FIG. 4, in which the windings 12 comprise a radial alignment, the bisector of the angle 26 and the radius 30 of the contact element 10 coincide substantially. The twelve windings 12 of the contact element correspond approximately to the nominal number of windings for an installation diameter DE of about 13 mm, a radial extension Er of about 4.5 mm and a wire diameter DD of about 1 mm.

Figure 5:
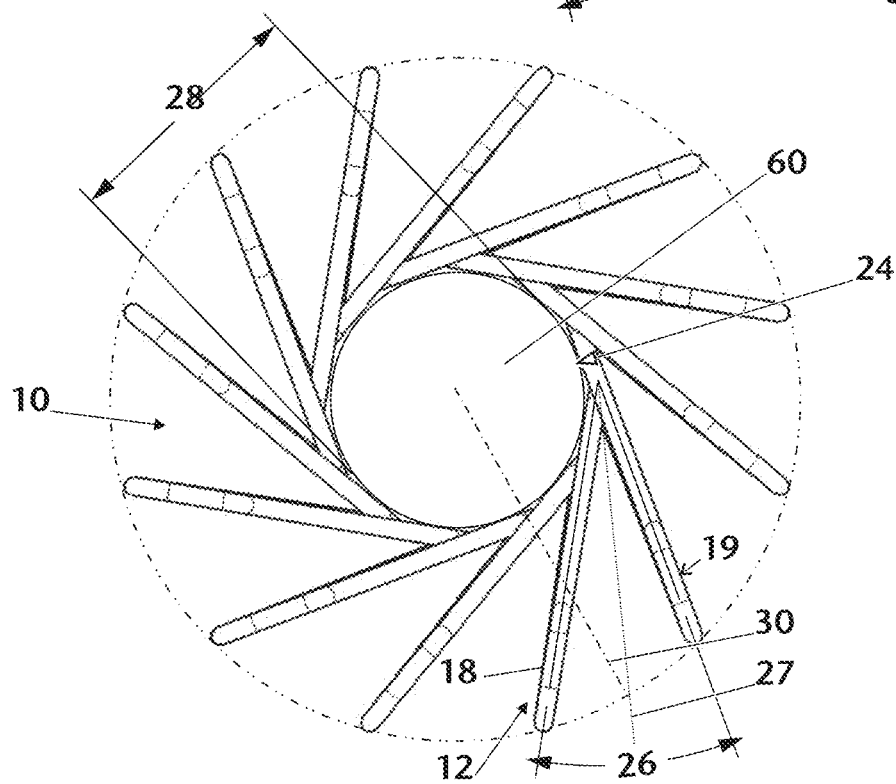
FIG. 5 is a top view of the contact element from FIG. 2 in the installed state.

FIG. 5 shows a top view of the contact element 10 from FIG. 2 in the installed state. A long-molded part 60 is arranged in the through opening 24 of the contact element 10. The windings 12 are deformed by the long-molded part 60 in such a way that the orientation or the bisector 27 of the angle 26, which is spanned by the extending sections 18 and 19, is at an angle to the radius 30 of the contact element 10. The long-molded part 60 expands the diameter 28 of the through opening 24 to the outer diameter of the long-molded part 60, which is not specifically designated here.

Figure 6:
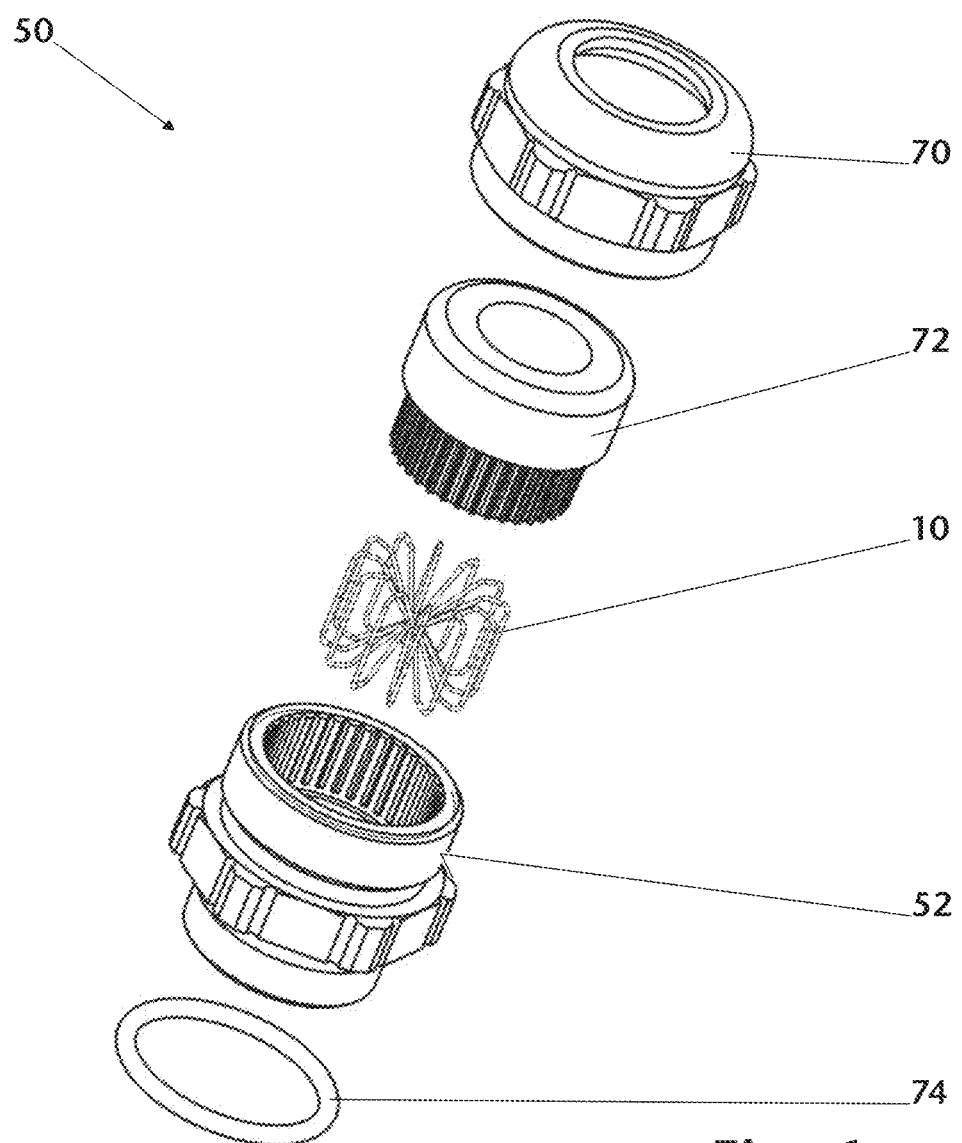
FIG. 6 is an exploded view of a cable gland with the contact element from FIG. 2 according to the present disclosure.

FIG. 6 shows an exploded view of a cable gland 50 with the contact element 10 of FIG. 2. The cable gland 50 comprises a compression nut 70, a sealing element 72 as well as a component 52 and an O-ring 74. A contact element 10 is arranged in the component 52. The pressure nut 70 can be screwed onto the component 52, whereby the sealing element 72 is compressed and can fit tightly around a long-molded part not shown. The O-ring 74 can seal the cable gland 50 against a connection geometry not shown.

Figure 7:
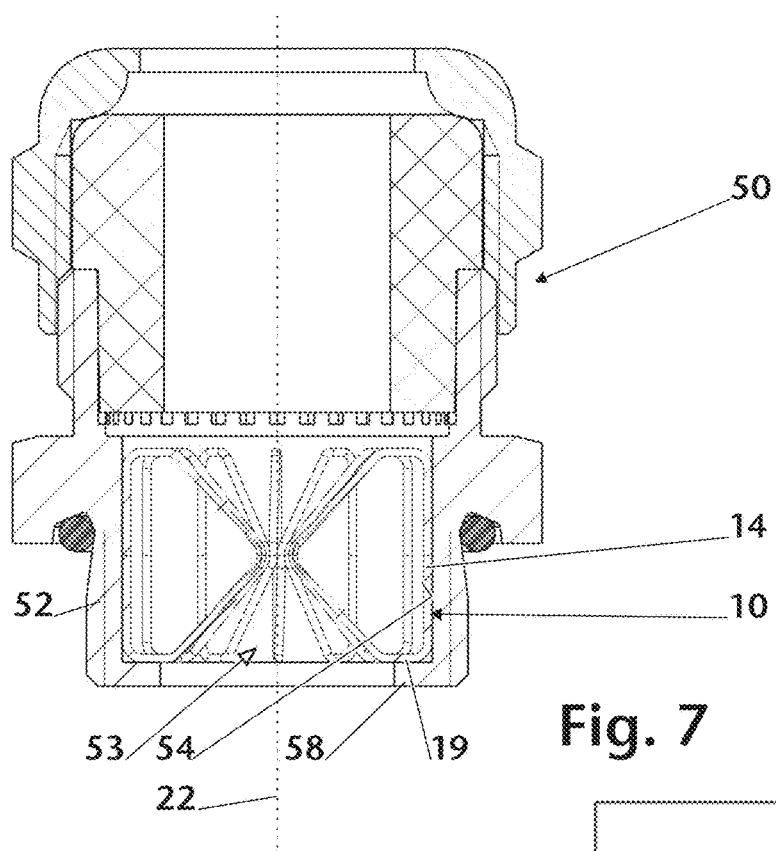
FIG. 7 is a sectional view of the cable gland from FIG. 6.

FIG. 7 shows a sectional view of the cable gland 50 of FIG. 6. The contact element 10 is held in a chamber 53 of the component 52 by the radially circumferential shoulder 58. The chamber 53 is bounded radially to a central longitudinal axis 22 by an inner wall 54 and along the central longitudinal axis 22 by a radially circumferential shoulder 58. The second extending section 19 contacts the shoulder 58. By electrically contacting the shoulder 58 with the second extending section 19, an advantageous conduction of currents can be achieved. The retaining section 14 contacts the inner wall 54 of the chamber 53. By electrically contacting the retaining section 14 with the inner wall 54 of the chamber 53, an advantageous conduction of currents can also be achieved. Due to the example of the contact element 10, the inner surface of the chamber 53 is utilized for current dissipation.

Figure 8:
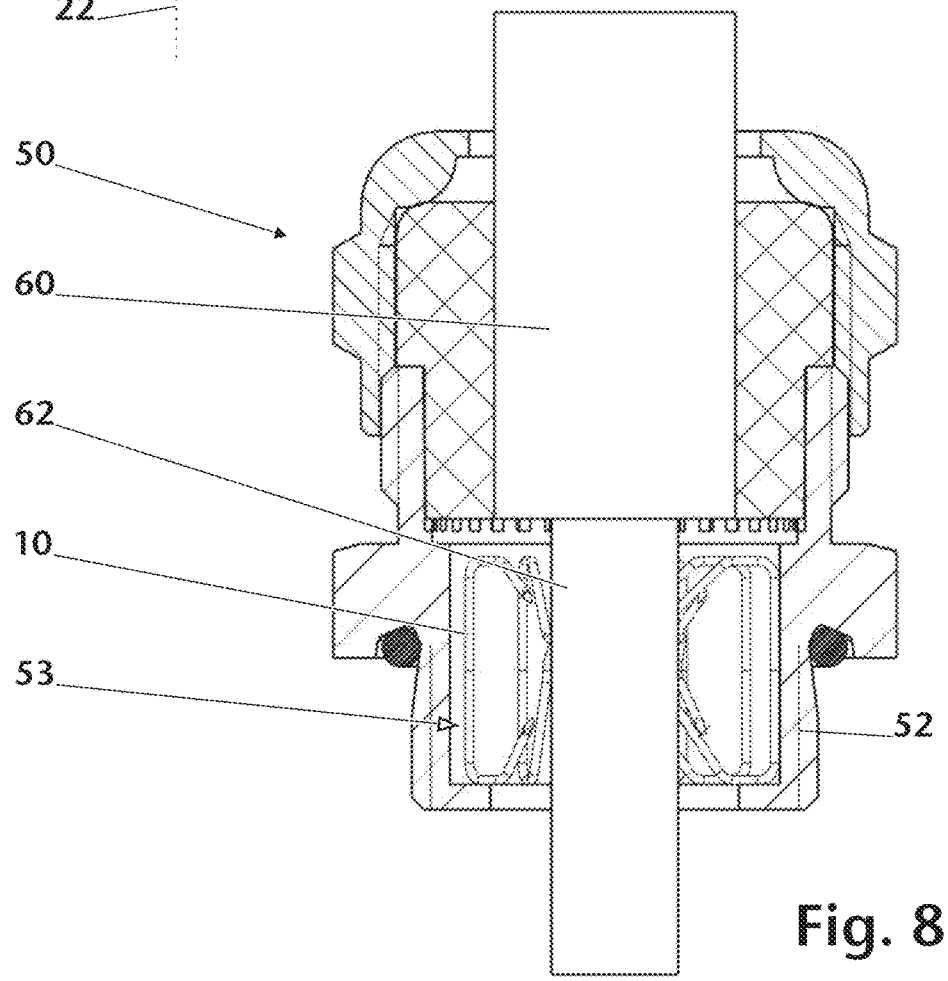
FIG. 8 is a sectional view of the cable gland from FIG. 6 with a long-molded part.

FIG. 8 shows a sectional view of the cable gland 50 of FIG. 6 with a long-molded part 60. The long-molded part 60 comprises a stripped part in which a shield 62 is exposed. The shield 62 is electrically contacted in the chamber 53 of the component 52 by the contact element 10. Due to the shape of the spring-like contact element 10, in particular due to the provision of first and second extending sections 18 and 19, the contact element 10 is torsionally rigid during assembly of the long-molded part 60 in such a way that tilting of the contact element 10 in the chamber 53 is inhibited.

Figure 9:
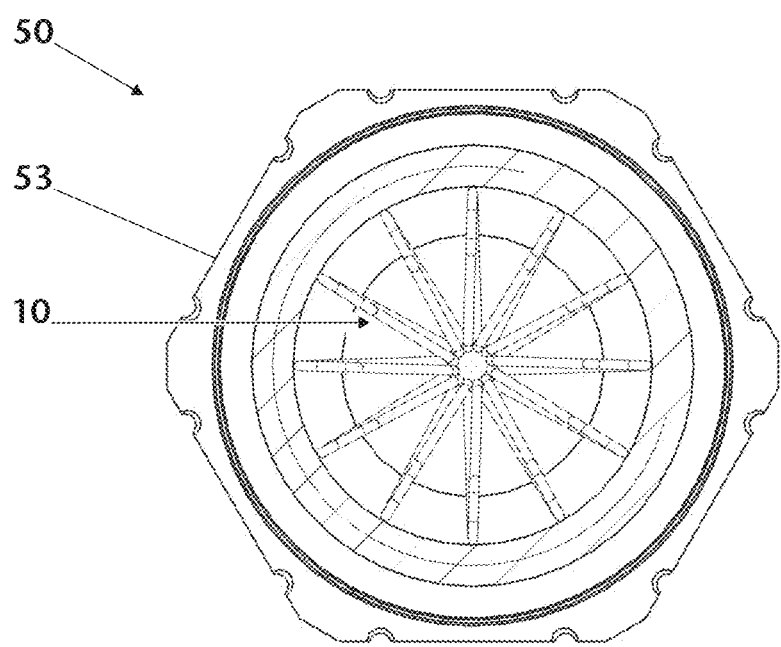
FIG. 9 is a sectional view of the cable gland from FIG. 7.

FIG. 9 shows a sectional view of the cable gland 50 of FIG. 7 in the area between the radially circumferential shoulder 58 and the contact element 10. The contact element 10, which is arranged in the chamber 53, can be seen.

Figure 10:
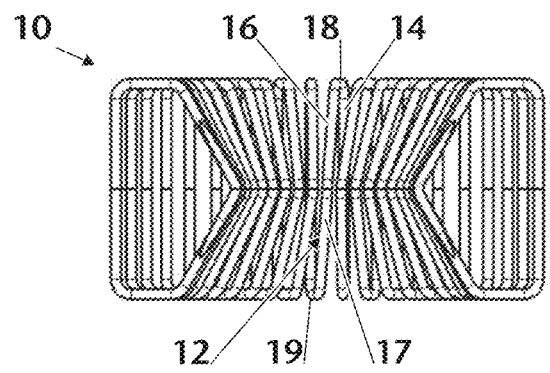
FIG. 10 is a sectional view X-X as shown in FIG. 11 of an alternative contact element according to the present disclosure.
Figure 11:
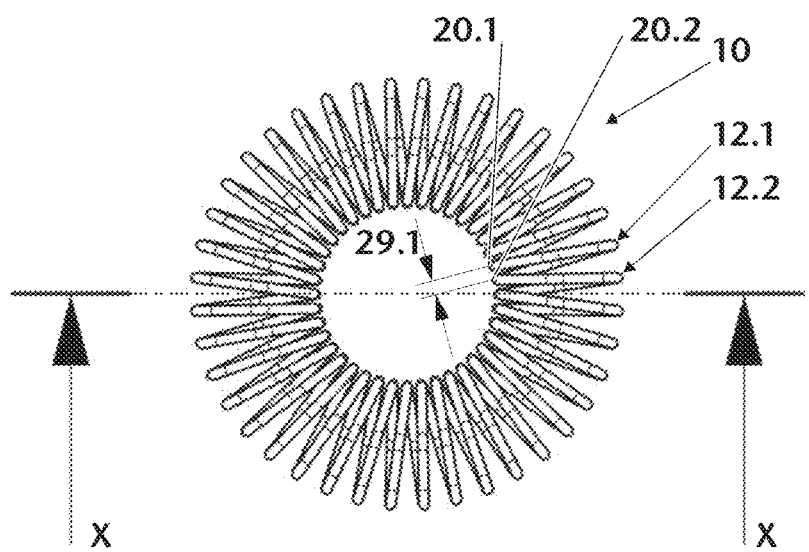
FIG. 11 is a top view of the contact element from FIG. 10 in the non-inserted state according to the present disclosure.

FIG. 10 shows a sectional view X-X according to FIG. 11 of an alternative contact element 10 with 40 windings 12, of which only one is labeled for the sake of clarity. The winding 12 comprises a retaining section 14, a first extending section 18, a first supporting section 16, a second supporting section 17 and a second extending section 19, which adjoin one another in the order indicated.

FIG. 11 shows a top view of the contact element from FIG. 10 in the non-inserted state. A distance 29.1 is provided between the windings 12.1 and 12.2 in the area of the supporting sections, which are not designated for the sake of clarity, or the radial sections 20.1 and 20.2 between the first and second supporting sections.

Figure 12:
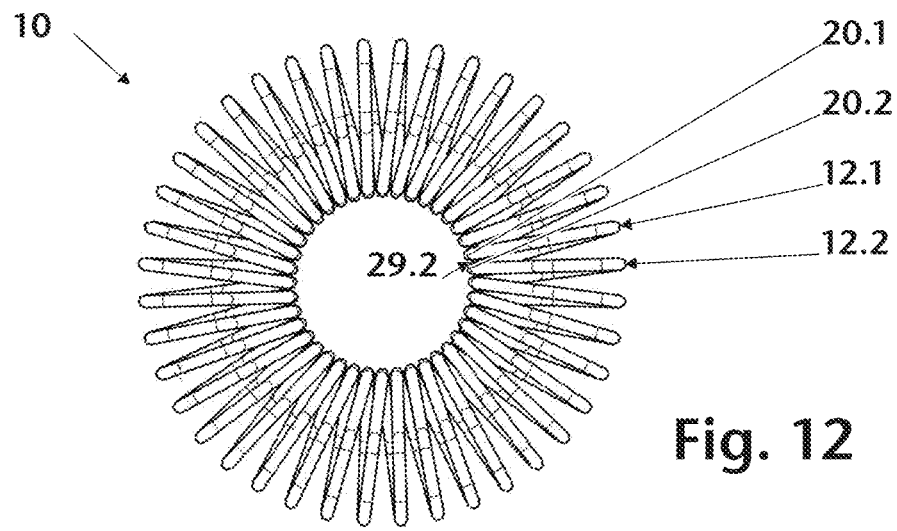
FIG. 12 is a top view of the contact element from FIG. 11 in the inserted state.

FIG. 12 shows a top view of the contact element 10 from FIG. 11 in the inserted state. The distance 29.2 between the supporting sections, which are not labeled for the sake of clarity, or the radial sections 20.1 and 20.2 between the first and second supporting sections of the windings 12.1 and 12.2 is smaller than the distance 29.1 in FIG. 11 or completely closed due to the radial compression in the chamber not shown.

Figure 13:
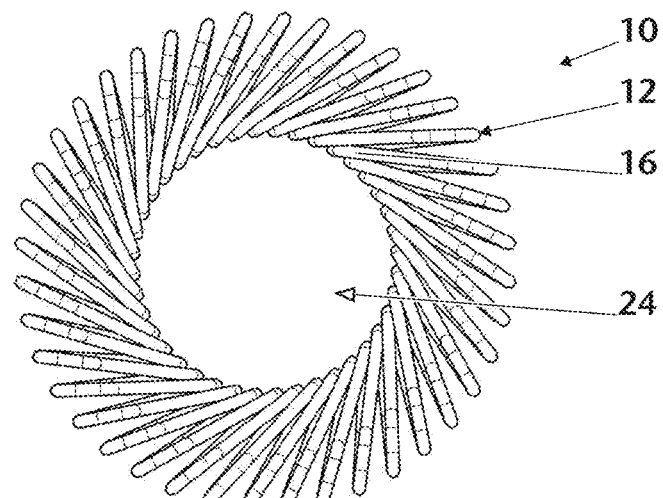
FIG. 13 is a top view of the contact element from FIG. 11 in the installed state.

FIG. 13 shows a top view of the contact element 10 from FIG. 11 in the installed state. The not shown long-molded part, which is arranged in the through opening 24, deforms the windings 12 in such a way that they touch each other in the area of the supporting sections 16.

Figure 14:
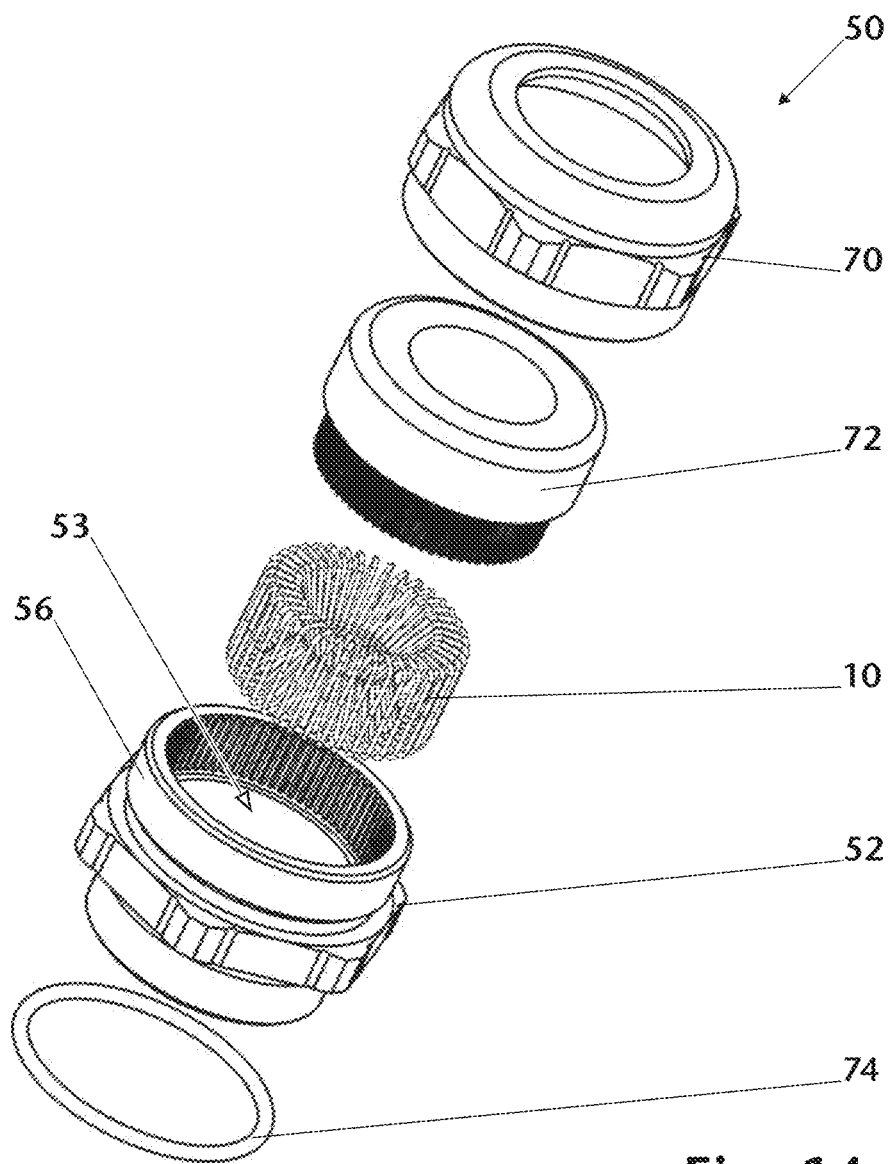
FIG. 14 is an exploded view of an alternative cable gland with the contact element from FIG. 11 according to the present disclosure.

FIG. 14 shows an exploded view of an alternative cable gland 50 with the contact element 10 of FIG. 11. The cable gland 50 comprises a compression nut 70, a sealing element 72 as well as a component 52 and an O-ring 74. The contact element 10 is arranged in the chamber 53 of the component 52. The pressure nut 70 can be screwed on—to an external thread 56 of the component 52, whereby the sealing element 72 is compressed and can fit tightly around a long-molded part not shown. The O-ring 74 can seal the cable gland 50 against a connection geometry not shown.

Figure 15:
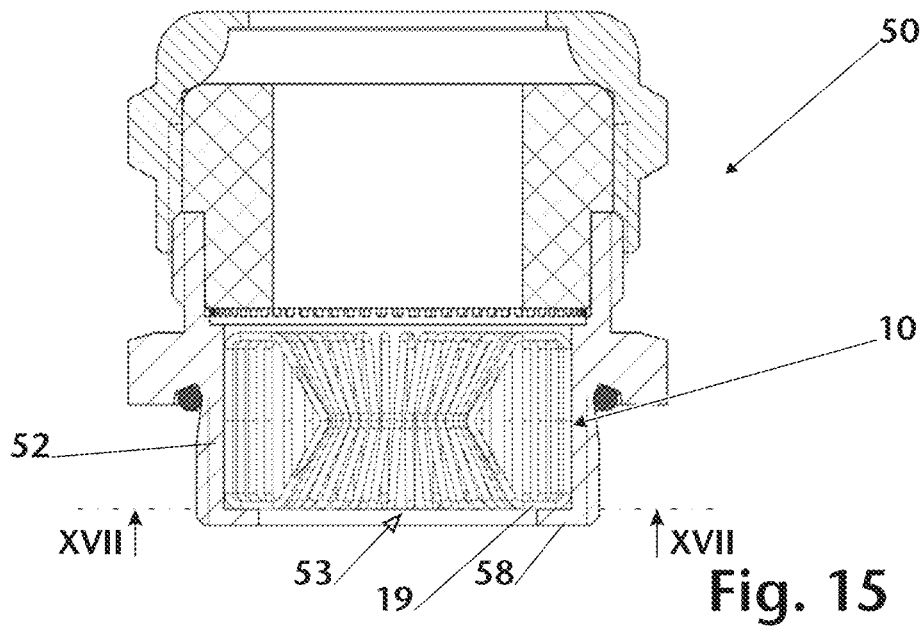
FIG. 15 is a sectional view of the cable gland from FIG. 14.

FIG. 15 shows a sectional view of the cable gland 50 of FIG. 14, in which the contact element 10 is arranged in the chamber 53 of the component 52, which is held by the circumferential shoulder 58. The extending section 19 rests on the shoulder 58.

Figure 16:
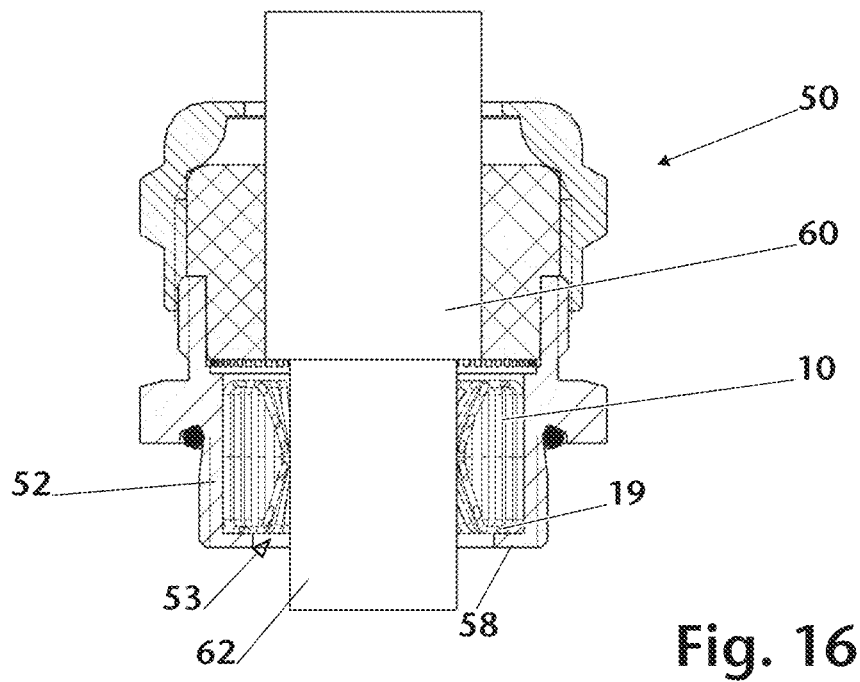
FIG. 16 is a sectional view of the cable gland of FIG. 14 with a long-molded part.

FIG. 16 shows a sectional view of the cable gland 50 of FIG. 14 in which the contact element 10 is arranged in the chamber 53 of the component 52, which is held by the circumferential shoulder 58. The extending section 19 rests on the shoulder 58. A long-molded part 60 is arranged in the cable gland 10, the shield 62 of which is electrically contacted by the contact element 10.

Figure 17:
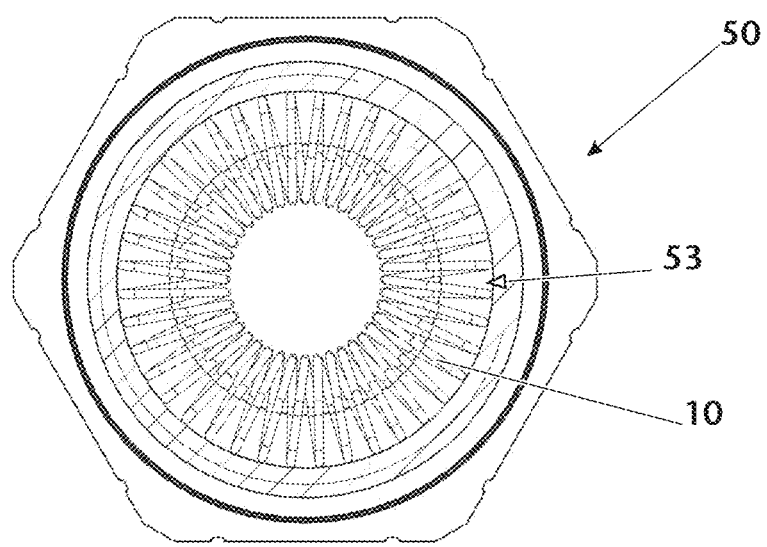
FIG. 17 is a sectional view XVII-XVII of the cable gland from FIG. 15.

FIG. 17 shows a sectional view XVII-XVII of the cable gland 50 of FIG. 15. The contact element 10 is arranged in the chamber 53.

The contact element 10 can be conveniently inserted into a cable gland 50, whereby tilting and unintentional twisting of the contact element 10 is inhibited, in particular when the long-molded part 60, which is in particular flexible, is mounted in the cable gland 50. Furthermore, the shape of the contact element 10 advantageously provides the largest possible electrical contact surface with the component 52.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. Cable gland comprising a component and at least one contact element, the at least one contact element comprising a plurality of substantially geometrically identically shaped windings, each winding comprising a retaining section for electrically contacting the component surrounding the contact element, at least one first and one second supporting section for electrically contacting a shield of a long-molded part and a first and a second extending section, the retaining section, the first extending section and the at least two supporting sections being arranged one after the other and the first supporting section and the second supporting section adjoining each other.

2. Cable gland according to claim 1, characterized in that the first and/or the second extending section extend in a straight line.

3. Cable gland according to claim 1, characterized in that the retaining section, the first extending section, the second extending section and/or the at least one first and one second supporting section are substantially arranged rectilinear.

4. Cable gland according to claim 1, characterized in that a radial section is formed between the retaining section and the first and second extending sections and/or between the at least one first and one second supporting section and the first and second extending sections.

5. Cable gland according to claim 1, characterized in that the first supporting section and the second supporting section have approximately the same length.

6. Cable gland according to claim 1, characterized in that the contact element has an annular or toroidal shape.

7. Cable gland according to claim 1, characterized in that the contact element comprises a component with a chamber which is bounded radially to a central longitudinal axis by an inner wall and along the central longitudinal axis by at least one at least partially circumferential shoulder.

8. Cable gland according to claim 7, characterized in that the first and/or the second extending section at least partially abuts against the at least one at least partially circumferential shoulder and/or the end wall.

9. Cable gland according to claim 1, characterized in that at least one retaining section of the at least one contact element abuts against an inner wall of a component of the cable gland.

10. Cable gland according to claim 1, characterized in that the at least one contact element is accommodated in a chamber of a component which has at least one external thread, whereby the at least one long-molded part is guidable through the component.

11. Cable gland according to claim 1, having at least one long-molded part which is arranged at least partially in a chamber with the at least one contact element, wherein the cable gland and the at least one long-molded part form an installed state, wherein in the installed state the at least one supporting section of each winding of the at least one contact element abuts at least partially against a shield of the long-molded part and the windings deviate from a radial alignment.

12. Use of a cable gland according to claim 1 for electrically contacting at least one shield of at least one long-molded part.

* * * * *